United States Patent
Schulz

(10) Patent No.: US 8,276,970 B2
(45) Date of Patent: Oct. 2, 2012

(54) LINKAGE LID CONFIGURATION, AND VEHICLE HAVING A LINKAGE LID CONFIGURATION OF THIS TYPE

(75) Inventor: Lars Schulz, Schoeneiche (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 13/115,573

(22) Filed: May 25, 2011

(65) Prior Publication Data
US 2011/0291438 A1  Dec. 1, 2011

(30) Foreign Application Priority Data
May 25, 2010 (DE) .................. 10 2010 021 400

(51) Int. Cl.
*B60J 7/20* (2006.01)
(52) U.S. Cl. .............................. 296/107.08; 296/136.06
(58) Field of Classification Search ............. 296/107.08, 296/136.06
See application file for complete search history.

(56) References Cited

U.S. PATENT DOCUMENTS

| 5,921,608 | A | 7/1999 | Schmitt et al. |
| 6,682,149 | B1 * | 1/2004 | Guillez et al. ................. 296/108 |
| 7,857,374 | B2 * | 12/2010 | Weismuller et al. .......... 296/124 |

FOREIGN PATENT DOCUMENTS

| DE | 19538738 C1 | 1/1997 |
| DE | 102004041538 A1 | 3/2006 |
| DE | 102006058962 A1 | 6/2008 |

* cited by examiner

*Primary Examiner* — Joseph Pape
(74) *Attorney, Agent, or Firm* — RatnerPrestia

(57) ABSTRACT

A linkage lid configuration for a motor vehicle having a displaceable roof configuration, has a movable lid which opens or closes a linkage passage opening and is guided during its movement at least in sections by a displaceable guide track. In order to optimize the linkage lid configuration, there is provision for the displaceable guide track to be configured such that it can be displaced independently of the lid and, in a displacement position, to be moved out of a movement path of a movable component of the motor vehicle.

14 Claims, 4 Drawing Sheets

LINKAGE LID CONFIGURATION, AND VEHICLE HAVING A LINKAGE LID CONFIGURATION OF THIS TYPE

CROSS-REFERENCE TO RELATED APPLICATION

This application claims the priority, under 35 U.S.C. §119, of German application DE 10 2010 021 400.0, filed May 25, 2010; the prior application is herewith incorporated by reference in its entirety.

BACKGROUND OF THE INVENTION

Field of the Invention

The invention proceeds from a linkage lid configuration for a motor vehicle having a displaceable roof configuration.

A linkage lid configuration of this type for a cabriolet with a displaceable hood is known from German patent DE 195 38 738 C1, corresponding to U.S. Pat. No. 5,921,608. The linkage lid configuration has a movable lid, by way of which a linkage passage opening can be opened or closed. During its movement between an open position which opens the linkage passage opening and a closed position which closes the linkage passage opening, the lid is guided at least in sections by a guide track. FIG. 7 of German patent DE 195 38 738 C1 shows a guide track 43 of this type which interacts with a guide element 44 which is fixed on the vehicle and is attached to the lid bearing, in order to move the linkage lid into its final end position, in which it is oriented approximately flush with the area of an adjacent trim part. As a result of the fact that the guide track is arranged on the underside of the linkage lid, the guide track can be displaced together with the linkage lid when the lid is moved between the closed and open positions. The guide track on the underside of the lid is of relatively short configuration and is therefore suitable for guiding the lid only for a short movement section.

SUMMARY OF THE INVENTION

It is accordingly an object of the invention to provide a linkage lid configuration, and a vehicle having a linkage lid configuration of this type which overcomes the above-mentioned disadvantages of the prior art devices of this general type, which is an improve linkage lid configuration to such an extent that increased guidance for the lid is possible.

With the foregoing and other objects in view there is provided, in accordance with the invention a linkage lid configuration for a motor vehicle having a displaceable roof configuration and a movable component. The linkage lid configuration contains a displaceable guide track and a movable lid which opens and closes a linkage passage opening and is guided during movement at least in sections by the displaceable guide track. The displaceable guide track is configured such that the displaceable guide track can be displaced independently of the moveable lid and, in a displacement position, the displaceable guide track is moved out of a movement path of the movable component of the motor vehicle.

The advantages which are achieved by way of the linkage lid configuration according to the invention are to be seen in the fact that, as a result of its capability to be displaced independently of the lid, the guide track can be displaced or moved away when it is not necessarily required for the guidance of the lid. Here, a movement path can advantageously be opened which is assigned to another movable component of the motor vehicle. The movable other component can be, for example, a hood linkage or a drive linkage for an equipment part of the motor vehicle. The guide track is therefore available for the lid when the latter is to be moved between its open position which opens the linkage passage opening and its closed position which closes the linkage passage opening. If no movement of the lid is provided, the guide track can be displaced independently of the lid, with the result that the movement path for the other component of the motor vehicle is opened. The guide track can therefore be configured with virtually any desired length, with the result that it can be available for guidance of the lid during a very long adjustment travel. It is therefore not necessary to arrange many different guide tracks at different locations, as is provided according to German patent DE 195 38 738 C1 which is mentioned in the introduction.

One preferred exemplary embodiment is distinguished by the fact that the displaceable guide track has at least one straight and one curved section. Lids of this type are usually moved for the linkage passage opening between a stored upright position below a trim part and an approximately horizontal position, in which they close the linkage passage opening. This therefore results in a movement sequence which can be guided by the displaceable guide track according to the invention by way of a straight and a curved section.

One exemplary embodiment is particularly preferred, in which the displaceable guide track can be displaced into at least two displacement positions which in each case represent an end position. In one of the displacement positions, the guide track is set in such a way that the lid can be guided during its movement. In the other of the displacement positions, the guide track is moved out of the movement path of the other component.

Furthermore, one exemplary embodiment is particularly preferred, in which the displaceable guide track adjoins a stationary or immovable guide track for the lid in one of the displacement positions, in particular an end position. The guide travel during the movement of the lid can thus be increased further. Here, the stationary guide track can be formed, for example, on an adjacent trim part which adjoins the linkage passage opening or delimits the linkage passage opening itself, but does not disrupt the movement path of the other component.

In particular, there is provision according to one preferred exemplary embodiment for it to be possible for the displaceable guide track to be moved out of the movement path when the lid closes the linkage passage opening. Here, however, the lid can still be guided by the stationary guide track. In the closed position of the lid, the entire length of the guide tracks no longer has to be provided. It is therefore sufficient if only the stationary guide track is still present for guiding the lid. In particular, there is therefore provision for the stationary guide track to be assigned to one of the end positions of the lid. In particular, the stationary guide track is assigned to the closed position of the lid when the latter closes the linkage passage opening.

In order that the guide track can be moved out of the movement path of the other component, there is provision, in particular, for the displaceable guide track to be coupled in terms of its movement between the two displacement positions to a movement of the other component. There can therefore be provision for the guide track to be moved out of the movement path at the start of the movement of the other component. When the movement of the other component is finished, the displaceable guide track can be moved back again. However, it can also be left in the displacement position, in which it is moved out of the movement path. It is then preferably moved back into its other displacement position again when the other component is likewise moved back again and assumes its end position.

The displaceable guide track is particularly preferably arranged on a movable element of the other component. It is therefore moved away automatically when the movement of the other component is initiated.

Furthermore, one embodiment is preferred, in which an end position of the component corresponds with an end position of the displaceable guide track. In other words: if the component is situated in one of its end positions, the displaceable guide track likewise assumes one of its end positions.

Particularly advantageously, the linkage lid configuration according to the invention is used according to the invention in a vehicle having a displaceable roof configuration, which vehicle, moreover, has another movable component, in particular a wind deflector configuration which can be displaced between a rest position and an active position, as is known, for example, from German patent DE 10 2006 034 445 B3, corresponding to U.S. Pat. No. 7,399,025. In one preferred embodiment, the wind deflector configuration therefore forms the other movable component of the vehicle, which component was described in the introduction, the wind deflector configuration having a drive linkage, for which the movement path is provided. The wind deflector configuration can be used in a vehicle having the linkage lid configuration according to the invention, since the guide track does not disrupt or block the movement path of the drive linkage of the wind deflector configuration, which drive linkage lies under the trim part. If the wind deflector configuration is to be moved, which is possible, in particular, only when the lid is present in the closed position, the guide track is moved away by the drive linkage itself. The displaceable guide track is not required in the closed position of the lid, with the result that the guide track can be moved away readily out of the movement path of the drive device.

There is provision according to one particularly preferred exemplary embodiment for the trim part which, in particular, also has the linkage passage opening to have the stationary guide track.

In particular, there is provision according to one exemplary embodiment for the end positions of the displaceable guide track to correspond with the end positions of the wind deflector configuration, the displaceable guide track being moved out of the movement path, in particular, when the wind deflector configuration is to be adjusted between its rest position and its active position. If the wind deflector configuration is moved back out of the active position into the rest position, the displaceable guide track is also driven into its end position again and can then assume the guidance of the lid again when the latter is to be moved between the closed position and the open position.

Other features which are considered as characteristic for the invention are set forth in the appended claims.

Although the invention is illustrated and described herein as embodied in a linkage lid configuration, and a vehicle having a linkage lid configuration of this type, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
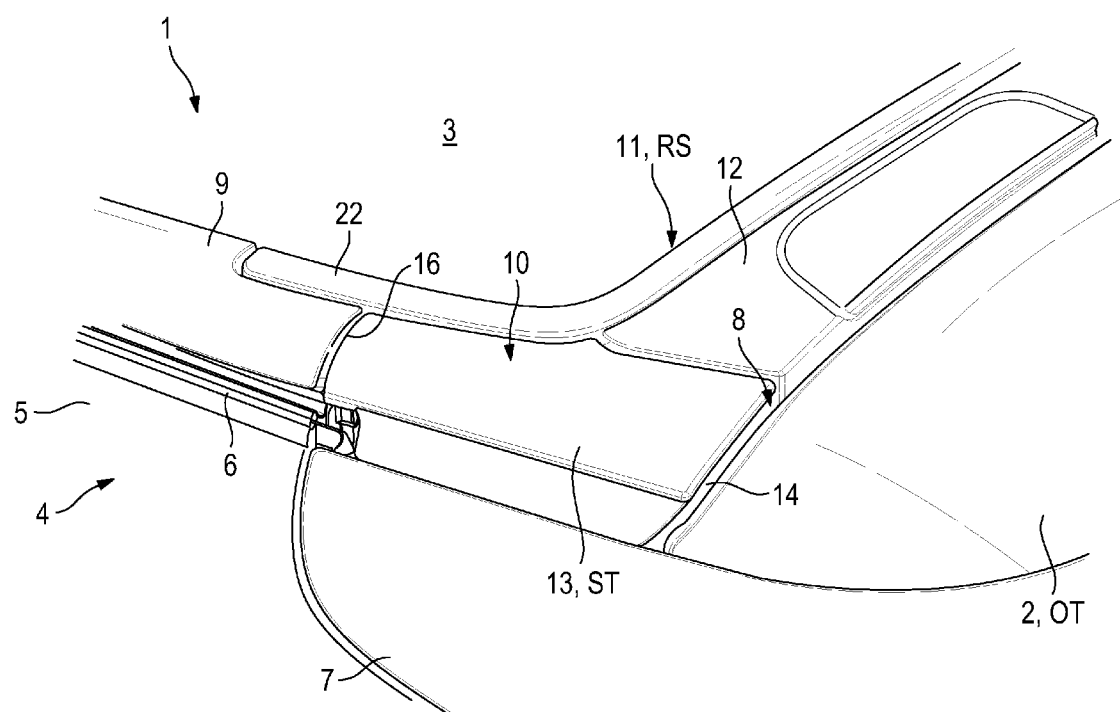
FIG. 1 is a diagrammatic, perspective view of a vehicle having a displaceable roof configuration, a wind deflector configuration and a linkage lid configuration in a closed position according to the invention.

Referring now to the figures of the drawing in detail and first, particularly, to FIG. 1 thereof, there is shown a detail of a vehicle 1, in particular a cabriolet, having a displaceable roof configuration 2, in particular a top, which opens a vehicle interior 3 in an open position OT in FIG. 1. FIG. 1 shows a view obliquely from the rear of the left-hand longitudinal side 4 of the cabriolet. The right-hand longitudinal side of the cabriolet is not shown, but is of mirror-symmetrical configuration with respect to the left-hand longitudinal side 4 shown here. The following parts of the cabriolet can be seen in FIG. 1: what is known as a rear side wall 5 which reaches as far as a waistline 6 of a body of the cabriolet, the rear side wall 5 being a constituent part of the body (not shown here in further detail); a compartment lid 7, in particular a hood compartment lid, which at least partially covers a storage compartment 8 lying underneath it for the displaceable roof configuration 2 when the compartment lid 7 assumes its closed position which is shown in FIG. 1; the roof configuration 2 which can be stored and is stowed in the storage compartment 8 in the open position OT; an inner trim panel or trim panel 9 which is assigned to the vehicle interior 3 and is arranged on the inner side of the rear side wall 5; a linkage lid configuration 10; a movable component 11 as equipment part of the vehicle, in particular cabriolet, and a cover or further trim panel 12 which is arranged in front of the storage compartment 8.

The linkage lid configuration 10 contains a lid 13 which is configured as a flat surface element which has an approximately rectangular shape. In FIG. 1, the lid 13 assumes an end position, a closed position ST here, in which it closes a linkage passage opening 14 in the trim panel 9, 12, the linkage passage opening 14 being provided for opening a region on the inner trim panel 9 when the displaceable roof configuration 2 is to be moved out of its open position OT which is shown into a closed position (not shown here), in which it covers the vehicle interior 3. The movable linkage of the displaceable roof configuration 2 can pass through the linkage passage opening 14 when the linkage passage opening 14 is open, which can be seen in FIG. 2. The linkage passage opening 14 is delimited by the cover 12, the compartment lid 7, the storage compartment 8 and one edge of the inner trim panel 9.

Figure 2:
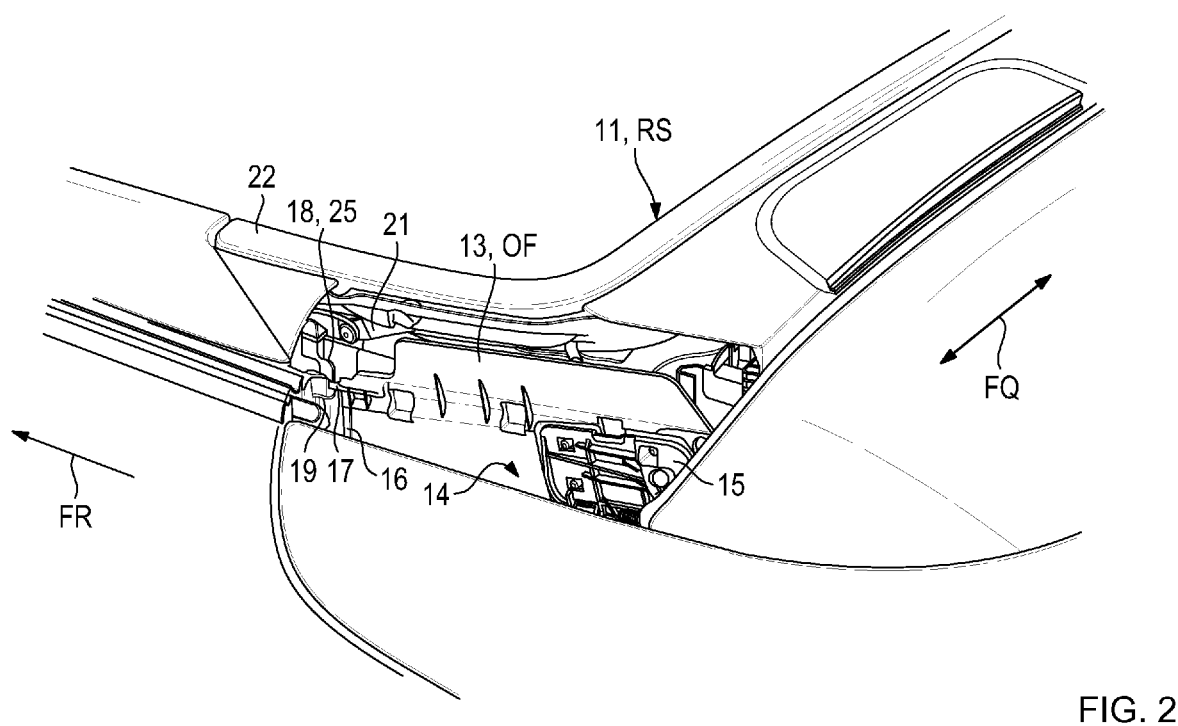
FIG. 2 is a perspective view of the vehicle according to FIG. 1 having the linkage lid configuration in the open position.

In the open position OF which is shown in FIG. 2, the lid 13 opens the linkage passage opening 14, with the result that the linkage (not shown) of the roof configuration 2 which can be stored can pass through the passage opening 14. The displaceable roof configuration 2 is configured, in particular, as a cabriolet top or hood, with the result that the linkage (not shown here) represents a top linkage. The lid 13 is mounted on a carrier plate 15 which is connected to a drive and guide device which cannot be seen here, lies below the waistline 6 and via which the linkage lid 13 can be moved in a driven manner between the closed position ST and the open position OF. In FIG. 2, the usual forward driving direction of the vehicle 1 is specified by the arrow FR; to this extent, the arrow FR points in the direction of the vehicle nose. In relation to this, the lid 13 has, at its front edge 16, a guide element 17 which projects from the edge 16 of the lid 13 in the direction of the arrow FR and is guided in an overall guide track 18. The lid 13 is therefore connected at its rear end to the guided carrier plate 15 which is held displaceably on the drive and guide device (not shown here). At its front end, the lid 13 is guided via the guide element 17 in the overall guide track 18. The overall guide track 18 has a lower end 19 (FIG. 3), adjacently to which the guide element 17 comes to lie when the lid 13 assumes its open position OF. An upper end 20 of the overall guide track 18 can be seen in FIGS. 3 and 5, the guide element 17 coming to lie adjacently to the upper end 20 in the closed position (FIG. 1). The overall guide track 18 is configured in sections as a groove or as a guide wall.

Figure 4:
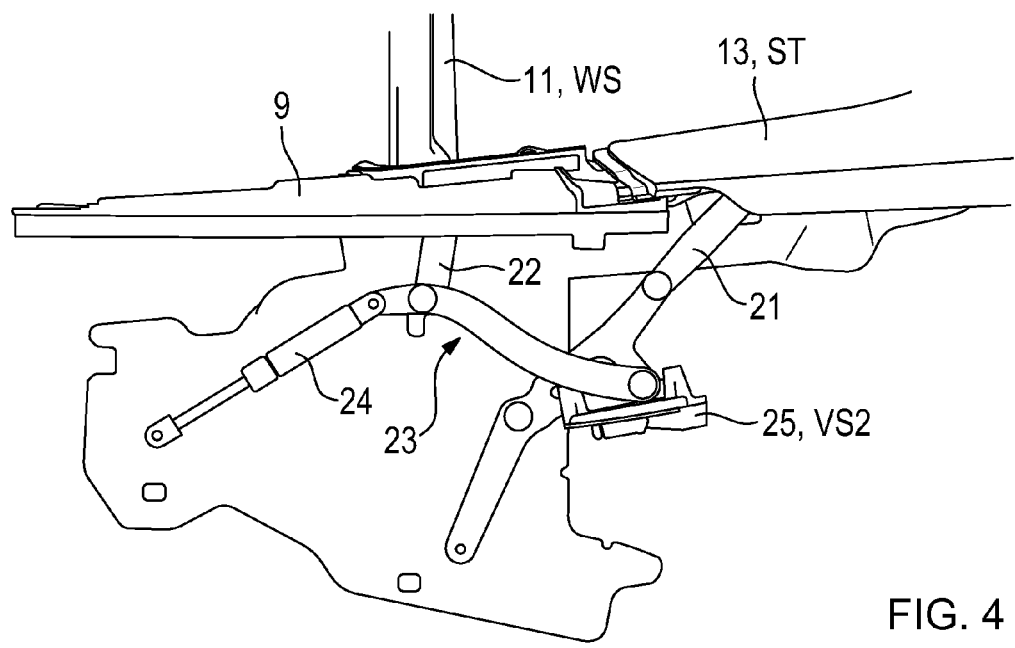
Figure 5:
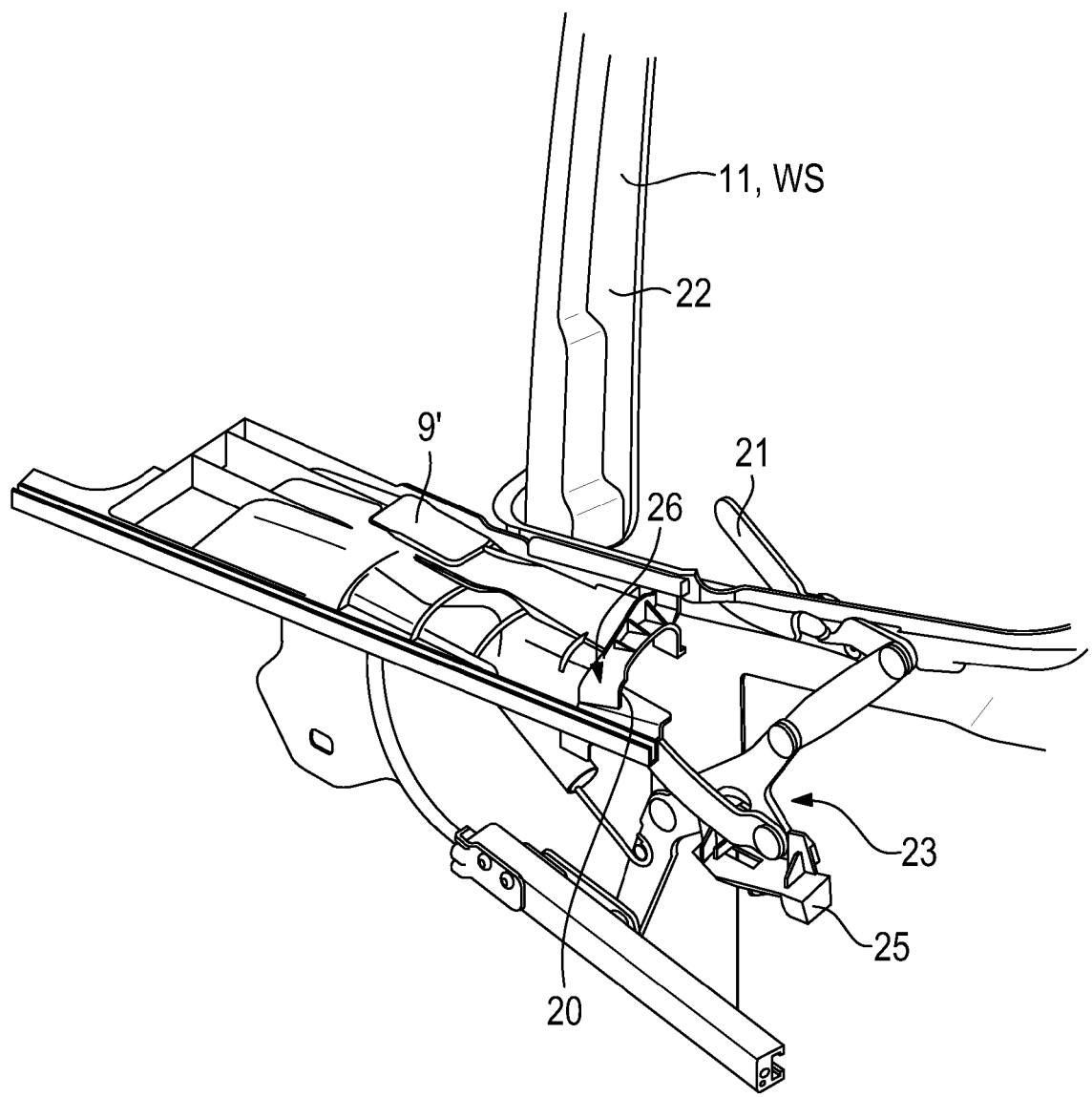

In the following text, the movable component 11 will also be described in greater detail. In FIGS. 1 and 2, the component 11 assumes a rest position RS which corresponds to an end position. In FIGS. 4 and 5, the component 11 assumes an active position WS which likewise corresponds to an end position of the component 11. The component 11 can be displaced between these two end positions, the rest position RS and active position WS. The component 11 contains two parts 21 and 22 which can be moved above the waistline 6, additionally extend as far as under the trim panel 9 and are connected to one another in terms of movement via a drive linkage 23 which lies under the trim panel 9, with the result that both parts 21, 22 are moved at the same time. Both parts 21 and 22 extend with a section as far as below the inner trim panel 9 and are connected there to the drive linkage 23. The drive linkage 23 firstly forms a coupler linkage between the two parts 21 and 22 and, moreover, a connecting linkage with a drive or damping unit 24. The two parts 21 and 22 are mounted adjacently to the waistline 6 in pivot pins which are oriented in the vehicle transverse direction FQ, and can thus be adjusted between the rest position RS and the active position WS. The two parts 21 and 22 form, in particular, hoops of a wind deflector configuration and span a surface element in the active position. A wind deflector configuration of this type is described in detail in German patent DE 10 2006 034 445 B3 which was mentioned in the introduction. To this extent, a further description of the document is omitted here, but the contents of German patent DE 10 2006 034 445 B3 is incorporated by reference herein (corresponding to U.S. Pat. No. 7,399,025).

Figure 3:
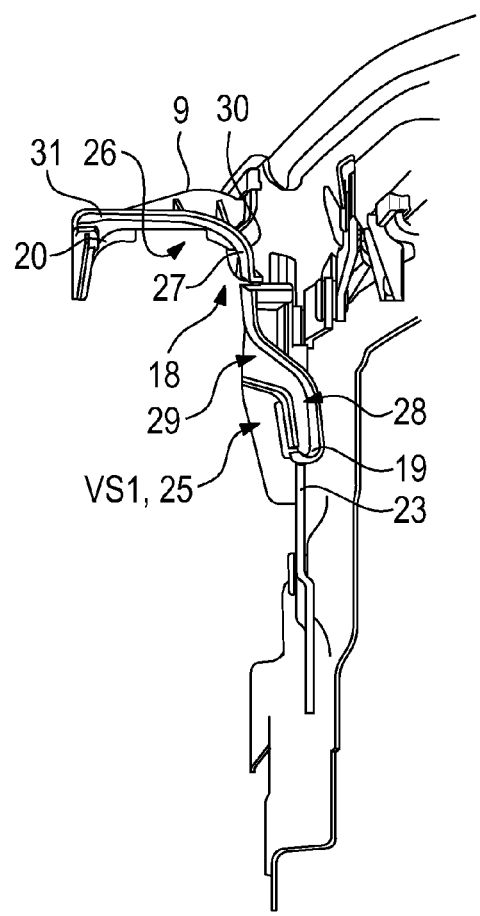
FIGS. 3 to 5 are perspective view showing the linkage lid configuration having a displaceable guide track in different displacement positions.

The component 11 with its movable drive linkage 23 passes through a movement path below the inner trim panel 9 and the linkage lid 13 when it is moved between two end positions (rest position RS and active position WS). As FIG. 3 shows, a lower section 25 of the overall guide track 18 is situated in this movement path, which lower section 25 is called a displaceable guide track 25 in the following text. An upper section 26 of the overall guide track 18 is called a stationary guide track 26 in the following text. In FIGS. 2 and 3, the displaceable guide track 25 is situated in a first displacement position VS1, in which it adjoins the stationary guide track 26 (FIG. 3), with the result that at least one substantially continuous guide face 27 of the overall guide track 18 is provided for the guide element 17. The displaceable guide track 25 is configured, in particular, as a groove or slot, while the upper section of the stationary guide track 26 is of substantially open configuration and merely has the guide face 27 or guide wall 27.

In FIGS. 4 and 5, the displaceable guide track 25 is moved out of the movement path of the component 11, but lies further under the trim panel 9. The guide track 25 is preferably pivoted, the pivot pin extending in the vehicle transverse direction FQ and preferably being formed by a joint of the drive linkage 23. Here, the lid 13 is situated in the closed position ST, as FIG. 4 shows. In the open position OF (FIG. 2) of the lid 13, the displaceable guide track 25 lies within the movement path of the component 11. The further displacement position VS2 (shown in FIG. 4) of the displaceable guide track 25 and the displacement position VS1 in each case form end positions in the movement of the displaceable guide track 25. Here, the displacement position VS1 is assigned as end position to the rest position RS of the component 11, while the second displacement position VS2 is assigned to the other end position of the component 11, namely the active position WS. The displaceable guide track 25 could be arranged on a dedicated movement device which moves the displaceable guide track 25 between its two displacement positions VS1 and VS2 when this is required, that is to say when the component 11 is to be moved between its end positions.

In the exemplary embodiment shown, the displaceable guide track 25 is arranged on one of the parts 21, 22 of the component 11 or on the drive linkage 23. Since the component 11 can be moved only when the lid 13 also assumes its closed position ST, in which the guide element 17 is guided in the stationary guide track 26, the exemplary embodiment shown is preferred, in which the displaceable guide track 25 is connected, as mentioned, to the component 11 or the drive linkage 23. The guide track 25 is therefore moved away when the component 11 is moved between its end positions.

According to FIG. 3, the displaceable guide track 25 has a straight section 28 and a curved section 29. The stationary guide track 26 likewise has a curved section 30 and a straight section 31. The curved section 30 adjoins the movable guide track 25, while the straight section 31 has the upper end 20 of the overall guide track 18. The lower end 19 is assigned to the displaceable guide track 25. The displaceable guide track is manufactured, in particular, as a separate component, in particular as a plastic molded part, and is fastened to the drive linkage 23 or one of the movable parts 21, 22 of the component 11. As an alternative, the displaceable guide track 25 could be arranged on a dedicated movement mechanism (not shown here) which then interacts with the component 11 in a positively controlled manner in such a way that, as described above, the guide track 25 is displaced out of the movement path. The stationary guide track 26 can be a constituent part of the inner trim panel 9 or a carrier 9' of the inner trim panel 9.

The invention claimed is:

1. A linkage lid configuration for a motor vehicle having a displaceable roof configuration and a movable component, the linkage lid configuration comprising:
    a displaceable guide track; and
    a movable lid which opens and closes a linkage passage opening and is guided during movement at least in sections by said displaceable guide track, said displaceable guide track configured such that said displaceable guide track can be displaced independently of said moveable lid and, in a displacement position, said displaceable guide track is moved out of a movement path of the movable component of the motor vehicle.

2. The linkage lid configuration according to claim 1, wherein said displaceable guide track has at least one straight section and one curved section.

3. The linkage lid configuration according to claim 1, wherein said displaceable guide track can be displaced into at least two displacement positions which in each case represent an end position.

4. The linkage lid configuration according to claim 1, further comprising a stationary guide track for said movable lid, said displaceable guide track adjoins said stationary guide track in one displacement position.

5. The linkage lid configuration according to claim 1, wherein said displaceable guide track can be moved out of the movement path when said movable lid closes the linkage passage opening.

6. The linkage lid configuration according to claim 3, wherein said displaceable guide track is coupled in terms of its movement between the two displacement positions to a movement of the component of the motor vehicle.

7. The linkage lid configuration according to claim 1, wherein said displaceable guide track is disposed on one of on a movable part or a drive linkage of the component.

8. The linkage lid configuration according to claim 1, wherein an end position of the component corresponds with an end position of said displaceable guide track.

9. A motor vehicle, comprising:
a displaceable roof configuration;
a movable component being moved between two end positions; and
a linkage lid configuration containing a displaceable guide track and a movable lid which opens and closes a linkage passage opening and is guided during movement at least in sections by said displaceable guide track, said displaceable guide track configured such that said displaceable guide track can be displaced independently of said moveable lid and, in a displacement position, is moved out of a movement path of said movable component.

10. The motor vehicle according to claim 9, wherein said movable component is a wind deflector configuration having a drive linkage.

11. The motor vehicle according to claim 10, further comprising a trim part which has said linkage passage opening formed therein.

12. The motor vehicle according to claim 11, wherein said trim part has a stationary guide track.

13. The motor vehicle according to claim 11, wherein a movement path of said movable component or of a drive linkage extends at least in sections under said trim part.

14. The motor vehicle according to claim 11, wherein said displaceable guide track is disposed under said trim part independently of its displacement position.

* * * * *